United States Patent Office 3,459,733
Patented Aug. 5, 1969

3,459,733
MONOMERIC POLYESTERS OF POLYHYDROXY COMPOUNDS AND PROCESS FOR PREPARING SAME
Wendell M. Byrd, Jr., and Vasco G. Camacho, Richmond, Va., assignors to Mobil Oil Corporation, a corporation of New York
No Drawing. Filed Oct. 15, 1964, Ser. No. 404,165
Int. Cl. C08b 19/00; C07d 7/18; C08g 17/00
U.S. Cl. 260—210
24 Claims This invention relates to new and novel chemical compounds and to processes for forming same, and, more particularly, to new and novel monomeric polyester polyols having low acid numbers and which are the reaction product of a dicarboxylic acid anhydride, a polyhydroxy compound, and an alkylene oxide.

It is known in the art, for example, U.S. Patent 3,089,863, to use polyhydroxy compounds as initiators in making polymeric resins from carboxylic acid anhydrides and alkylene oxides. Since alkylene oxides will not, even under the most severe conditions, react with the acid anhydride, it is necessary to use, as an initiator of the reaction, a minor quantity of a polyhydroxy compound. Thus, anhydride and monoepoxide monomers add alternately to the initiator, forming branch chains, and the resulting product has an alternating network of polymer substituents. Use of these initiators leads to chain extension and to linear polymers.

In the present invention, essentially nonpolymeric products having extremely low acid numbers are obtained by regulating the reaction conditions and proportions of the reactants in such a way that chain initiation is either nonexistent or present to such a small extent that it is an insignificant factor in the reaction.

The compounds of this invention have the chemical formula

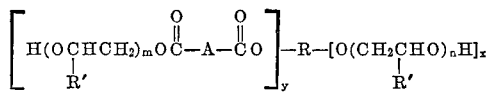

wherein A is the nucleus of an aromatic or aliphatic dicarboxylic acid anhydride; R is the nucleus of a polyhydroxy compound or polyol having from 2 to 8 hydroxyl groups; R' is H or a lower alkyl such as $CH_3$, $CH_3CH_2$—, or a halogen-substituted lower alkyl such as $CH_2Cl$; x is a number from 0 to 7; y is a number from 1 to 8; and when x is 0, then y is at least 4; m has a value of from 1.0–1.5; and n has a value of from 0.5–1.5.

The amount of the anhydride to be reacted with the polyhydroxy compound will depend upon the functionality of the polyhydroxy compound and the number of such functions which are to be reacted with the anhydride. However, it is critical that in the process of the present invention the amount of hydroxyl groups present will always at least equal the amount of anhydride, i.e., there will never be stoichiometrically less polyhydroxy compound than anhydride present in the reaction mixture to insure that all of the anhydride is combined with the polyol to form an acid reaction product. For example, if pentaerythritol is the polyol, not less than 0.25 mol would be used when 1.0 mol of anhydride, such as phthalic anhydride, is present in the mixture. There may, however, be more hydroxyl groups present on the polyhydroxy compound than there is anhydride to react therewith. The reaction may be illustrated as follows:

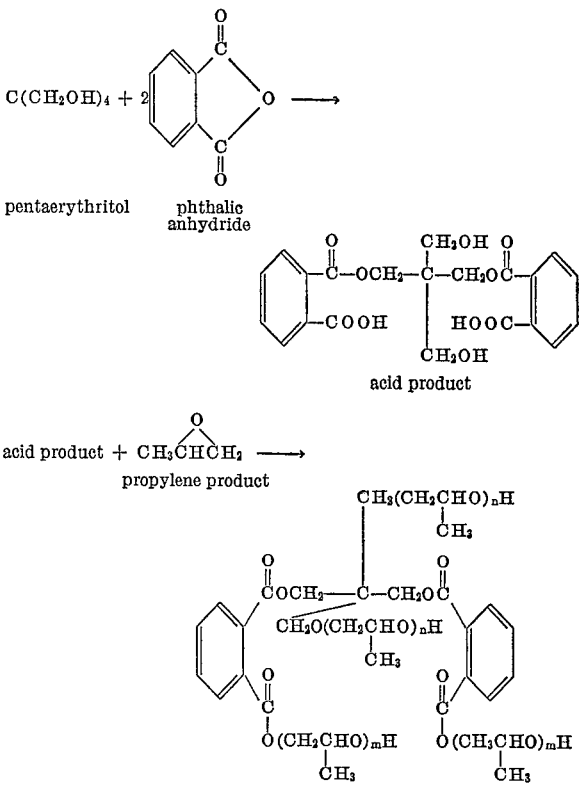

where m and n have the values indicated above.

The compounds of the invention may be produced by either a single-step process or a two-step process. In the single-step process, the dicarboxylic anhydride, polyhydroxy compound, and the alkylene oxide are placed together within a pressure chamber and reacted at a temperature of from about 90° C. up to 160° C. The actual lower temperature used will be governed by the particular anhydride and polyol being reacted. The alkylene oxide is present in excess, preferably in a molar ratio of 3 times the number of acid functions which are being neutralized. Thus, if one mol of pentaerythritol and one mol of phthalic anhydride are reacted, one carboxyl or acid function will be present to react with the oxide. It will then be sufficient to have 3 mols of alkylene oxide present in the pressure chamber. The ingredients are then subjected to sufficient heat to commence the reaction, which, once begun, is allowed to proceed exothermally until none of the polyhydroxy compound remains in the mixture. The mixture is continuously stirred throughout the reaction. The temperature, on exotherm, may be as high as 160° C., but is usually from 130 to 150° C. The time of the reaction will vary from about 2 to about 20 hours, depending upon the particular reactants and the number of mols of anhydride to be reacted with the polyhydroxy compound. After the exothermic reaction is completed, the temperature is lowered to preferably about 110° C. to complete the neutralization of the acid functions formed during the initial reaction. The excess oxide is removed in vacuo.

The product made in this single-step process is similar in all respects to the same product made from the same reactants by the two-step process to be described infra, further indicating that polyesters, rather than long-chain polymers, are formed. If the temperature of the reaction is permitted to exceed about 160° C., it will have a detrimental effect on the product. Since it is known that high temperatures are required for esterification, it necessarily follows that the higher the temperature, the greater the change for a carboxyl group to be esterified by reaction with the polyhydroxy compound being used. Therefore, temperatures where esterification will occur must be avoided.

With respect to the two-step process, the initial reaction occurs between the polyhydroxy compound and the anhydride, and the reaction can be conducted at a lower temperature than is necessary in the one-step process. For example, in the case of phthalic anhydride and pentaerythritol (see Example 1, infra), one hydroxyl opens the anhydride ring, generating a free carboxyl group. Since there is no alkylene oxide present, one of the remaining OH's of the polyhydroxy compound must react with another anhydride. Thus, all of the chain-extending sites are capped, leaving only the carboxyl groups from the anhydride nucleus and the remaining hydroxyls as sites for reaction with the alkylene oxides. Thus, the initial reaction to form the dicarboxylic acid ester may be run at virtually any temperature from about 90° C. to below the temperature at which esterification would occur. The important thing is to have the proper proportions of anhydride and polyhydroxy compounds necessary to give the desired product. Once the acid is formed, alkylene oxide is reacted therewith in a pressure apparatus, and here also the temperatures used are not critical. However, while temperatures of 110° C. to 130° C. are preferred, the reaction may be carried out at temperatures as high as 150° C. to 160° C., with no adverse effects on the resulting product.

The present invention broadly relates to new chemical compounds formed by the reaction of a dicarboxylic acid anhydride, a polyhydroxy compound having from 2 to 8 hydroxyl groups in its molecule, and an alkylene oxide. These new compounds have many uses, including those for which known polyesters and polyols are presently used. A principal use for the compounds of the invention is in the formation of polyurethanes and polyurethane foams wherein the compounds are reacted with organic polyisocyanates in the well-known processes for forming polyurethanes. Included among the dicarboxylic acid anhydrides suitable for the purposes of this invention are the aliphatic anhydrides such as adipic, azelaic, glutaric, suberic, itaconic, pimelic, succinic, acetone-dicarboxylic and maleic; the halogen-substituted aliphatic anhydrides such as chloro- or dichloromaleic; the alkyl-substituted aliphatic anhydrides, such as dimethyl-maleic, n-decylsuccinic and the like, wherein the alkyl has from 1 to 12 carbon atoms; hydrophthalic such as dihydrophthalic, tetrahydrophthalic, hexahydrophthalic; endomethylene phthalic; and others such as camphoric, 5-norbornene-2, and chlorendic anhydrides. ("Chlorendic" anhydride is the name for 1,4,5,6,7,7-hexachlorobicyclo-(2,2,1)-5-heptene-2,3-dicarboxylic anhydride.) Also included are the aromatic dicarboxylic acid anhydrides, such as phthalic, halogen-substituted phthalic such as 3 or 4-chloro-, bromo-, and iodo-phthalic, tetrachloro-, bromo-, or iodo-phthalic; nitro-substituted phthalic such as 3- or 4-nitro-phthalic; alkyl-substituted phthalic such as 3- or 4-methylphthalic wherein the alkyl has from 1 to 12 carbon atoms; homophthalic; naphthalic and the like anhydrides.

Included among the polyhydroxy compounds or polyols are the alkylene glycols such as ethylene, diethylene, triethylene, propylene, dipropylene, tripropylene, butylene and the like glycols; polyalkoxylated glycols such as polyethoxylated, polypropoxylated, polybutoxylated, etc., glycols listed above; alkyl-substituted glycol such as tetra-methyl, hexamethyl, neopentyl and the like; butenediol, butynediol; 2,2,4,4-tetramethyl-1,3-cyclobutanediol; cyclohexanediol; bisphenol A; dimethylolpropionic acid; trimethylol monoallyl ether; glycerol; polyalkylolalkanes such as trimethylolethane, trimethylolpropane, trimethylolbutane, trihydroxymethylaminoethane, pentaerythritol, dipentaerythritol, tripentaerythritol, methylglucoside, sorbitol, mannitol, sucrose, dextrose, fructose, maltose, polyalkoxylated sucrose and the like.

Included among the alkylene oxides for purposes of the invention are ethylene, propylene, and butylene oxides, although such oxides having up to about 8 carbon atoms give good results. Halogen-substituted alkylene oxides, such as epichlorohydrin may also be used and, as used in this disclosure, the term "alkylene oxide" includes substituted and unsubstituted oxides.

The following examples are merely illustrative of the processes of the invention and the new and novel compounds obtained thereby, and are not to be considered as limiting the scope of the invention in any manner.

EXAMPLE 1

296.2 parts of phthalic anhydride and 136.1 parts of pentaerythritol were placed in a Parr pressure apparatus, heated to 110° C., and maintained there for 3.5 hours while being continuously stirred. The reaction product had a theoretical acid value of 4.63 meq./gm. and a determined acid value of 4.59 meq./gm.

348.8 parts of propylene oxide were then forced into the apparatus with nitrogen pressure (120 p.s.i.) over a period of from 4–5 hours. The temperature rose rapidly to 125° C. and was kept there throughout the addition, while the mixture was continuously stirred. When the addition was completed and the pressure became constant (68 p.s.i.), the reaction mixture was stirred for an additional two hours at 120–125° C. After this aging period, the unreacted gaseous oxide was gradually released from the apparatus until atmospheric pressure was attained therein. The product was then stripped at 120° C. at 10 mm. of Hg to remove the remaining oxide. A total of 251.7 parts, or 4.33 mols, of propylene oxide had reacted. The product thus obtained had a molecular weight of 683.8, an OH number of 328.2, and an acid number of 2.55. The product had the formula:

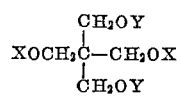

where

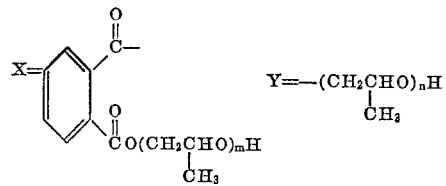

EXAMPLE 2

The process of Example 1 was repeated except that ethylene oxide was used in place of the propylene oxide and it was added to 347 gms. of the acid product resulting from the reaction of the anhydride and the pentaerythritol. The resulting reaction product had a molecular weight of 704.0, an OH number of 331.0, and an acid number of 0.49. The product had the formula:

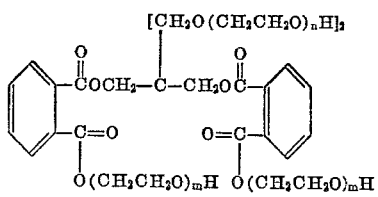

EXAMPLE 3

296.2 parts of phthalic anhydride and 134.2 parts of trimethylolpropane were placed in a resin flask and heated at 120–130° C. for 3 hours and 40 minutes while being continuously stirred. The product had a theoretical acid value of 4.65 meq./gm. and a determined acid value of 4.48 meq./gm.

373 parts of this acid were transferred to a Parr pressure apparatus, and 291.2 parts of propylene oxide were added thereto. The mixture was then heated under pressure (160 p.s.i.) at 110–120° C. for about 8 hours while being continuously stirred. At the end of this time a constant pressure of 50 p.s.i. had been reached. The excess oxide was removed in vacuo, and it was ascertained that 205 grams of oxide had reacted. The reaction product had a molecular weight of 676, an OH number of 249, and an acid number of 2.2. The reaction product had the formula:

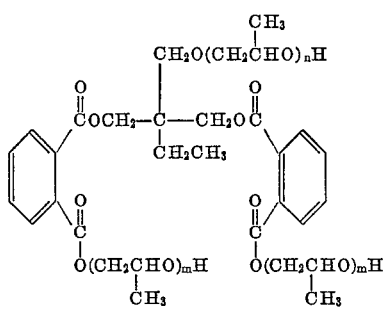

EXAMPLE 4

Example 3 was repeated, using ethylene oxide in place of the propylene oxide. 341.9 parts by weight (7.75 moles) of ethylene oxide were added to 387 parts of acid intermediate of Example 3 to give a product with a molecular weight of 650, an OH number of 259 and an acid number of 1.31. The resulting product had the following formula:

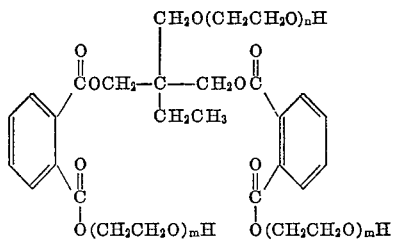

EXAMPLE 5

296.2 parts (2 moles) of phthalic anhydride, 194.2 parts (1 mole) of methyl glucoside, and 405 parts of propylene oxide were placed in a pressure apparatus and heated at a temperature of 120–125° C. for about 8 hours while being continuously stirred. Pressure inside the apparatus was 150 p.s.i. at the outset and it gradually decreased to a constant 35 p.s.i. Excess gaseous oxide was removed. The reaction product was stripped at 120° C. at 10 mm. Hg, and it was ascertained that 6.30 moles of the oxide had reacted per mole of formed acid. The product had a molecular weight of 856, an OH number of 261, and an acid number of 4.0. Its formula was:

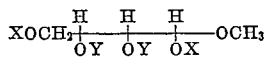

where X is

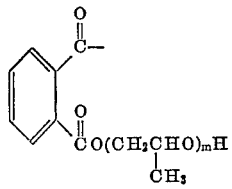

Y is

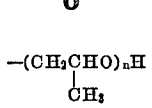

EXAMPLE 6

333.2 parts (2.25 moles) of phthalic anhydride, 256.7 parts of (0.75 mole) powdered sucrose and 457 parts of propylene oxide were placed in a Parr pressure apparatus and heated for about 8 hours at 130–150° C. while being continuously stirred. On removing the excess oxide from the formed product, it was found that 7.39 moles of oxide had been added, giving a product having a molecular weight of 1360, an OH number of 305 and an acid number of 0.80. The formed product has the formula:

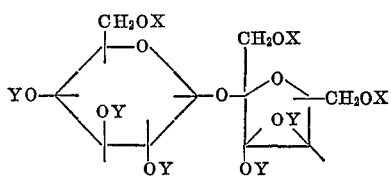

where X is

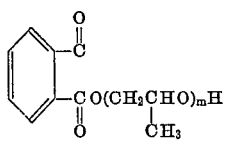

and Y is

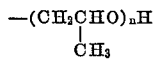

EXAMPLE 7

148.1 parts (1 mole) of phthalic anhydride and 426 parts (0.5 mole) of propoxylated sucrose containing 1.1 moles of propylene oxide per hydroxyl were placed in a resin flask and heated for 4 hours at 90–100° C. with the mixture being continuously stirred. The reaction product had a theoretical acid value of 1.74 meq./gm. and a determined acid value of 1.84 meq./gm.

520.2 parts of this product and 249.9 parts of propylene oxide were placed into a pressure apparatus and, while continuously stirred, were heated at 100–120° C. for about 5 hours. 85 parts of the oxide reacted, and the excess oxide was removed. The final product had a molecular weight of 1326, an OH number of 352, and an acid number of 0.27. It had the following formula:

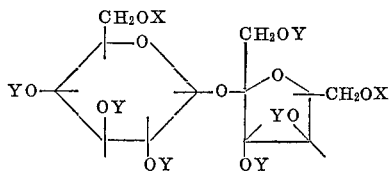

where X is

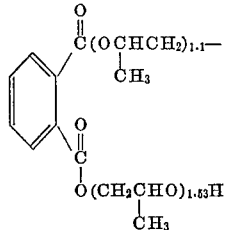

and Y is

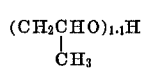

EXAMPLE 8

296.2 parts (2.0 moles) of phthalic anhydride and 426.0 parts (0.5 mole) of propoxylated sucrose containing 1.1 moles of propylene oxide per hydroxyl were heated in a resin flask to give an acid of the propoxylated sucrose having four of its OH groups reacted with the anhydride. Theoretical acid value was 2.77 meq./gm. and the determined acid value was 2.80 meq./gm.

679 parts of this formed acid and 331.2 parts of propylene oxide were placed in a pressure apparatus and heated for 4 hours at 115–120° C. while being constantly stirred. A maximum pressure of 118 p.s.i. at the outset gradually decreased to a constant pressure of 45 p.s.i. 143 grams of the oxide had reacted and the excess oxide was stripped from the product. The final product had a molecular weight of 7146, an OH number of 268, and an acid number of 0.18. It had the following structure:

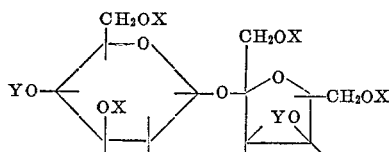

where X is

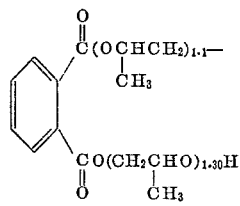

and Y is

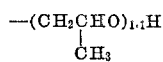

EXAMPLE 9

296.2 parts of phthalic anhydride and 284 parts of propoxylated sucrose containing 1.1 moles of propylene oxide per hydroxyl were placed in a resin flask and heated for 5 hours at 90–100° C. while being stirred continuously. The product was an acid of the polyol which had 6 of its OH groups reacted with anhydride. The product had a theoretical acid value of 3.45 meq./gm. and a determined acid value of 3.62 meq./gm.

553 parts of this formed acid and 349 parts of propylene oxide were placed into a Parr pressure apparatus and heated for 6 hours at 100–120° C. while being continuously stirred. The excess oxide was removed and it was determined that 147 grams of oxide had reacted with the formed acid. A product was obtained having a molecular weight of 2180, an OH number of 243, and an acid number of 0.17. It had the following formula:

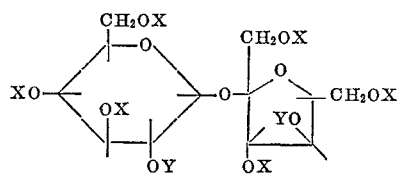

where X is

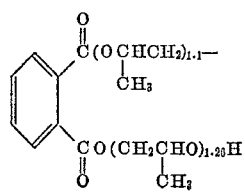

and Y is

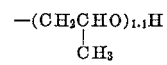

EXAMPLE 10

370.9 parts of chlorendic anhydride, 68.1 parts of pentaerythritol and 174.5 parts of propylene oxide were placed in a pressure apparatus and heated for 4 hours at 130–150° C., while being continuously stirred. A maximum pressure of 180 p.s.i. gradually decreased to a constant 75 p.s.i. during this time. The excess oxide was removed in vacuo, showing that a total of 110.0 parts of propylene oxide had been reacted, corresponding to a total of 3.8 moles of oxide per mole of product. The stripped product had a molecular weight of 1098, an OH number of 217, and an acid number of 0.38. The product had the formula:

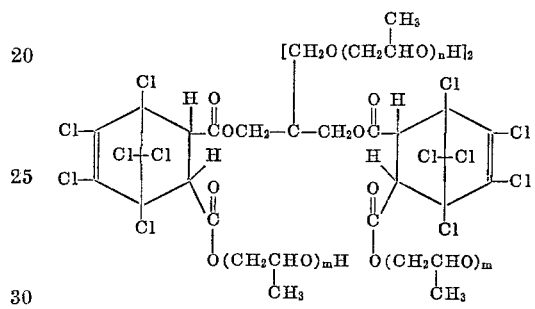

EXAMPLE 11

444.3 parts of phthalic anhydride and 102.1 parts of pentaerythritol were placed in a resin flask and heated, while being stirred continuously, at a temperature of 100–125° C. for 15 hours. The acid product which was formed had a theoretical acid value of 5.5 meq./gm. and a determined acid value of 6.14 meq./gm. 507 parts of acid product were transferred to a Parr pressure apparatus and 542.4 parts of propylene oxide were fed in under pressure (80–90 p.s.i.) over a period of 8 hours while the temperature was maintained at 130–135° C. and the mixture was continuously stirred. 261 parts of oxide reacted with the acid product. The resulting product had a molecular weight of 1063, an OH number of 194, an acid number of 0.15. The product had the formula:

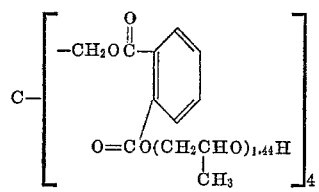

EXAMPLE 12

296.2 parts of phthalic anhydride, 182.2 parts of d-sorbitol and 135 parts of propylene oxide were placed together in a pressure apparatus, and an additional 345 parts of propylene oxide were forced in under $N_2$ pressure over a period of 10 hours while the mixture was maintained at a temperature of 135–140° C. and was continuously stirred. Upon removing the excess propylene oxide, it was noted that a total of 397.6 parts (6.86 moles) of oxide had been reacted. The reaction product had a molecular weight of 876, an OH number of 366, and an acid number of 7.23. The product had the following formula:

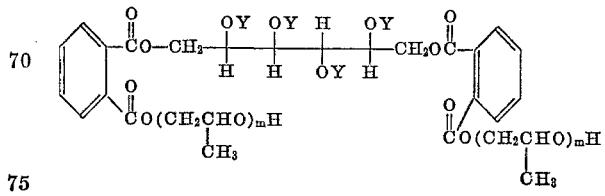

$$Y = -(CH_2CHO)_nH$$

By maintaining the mixture in the pressure apparatus for a period of 15 hours instead of the 10 hours shown above, the resulting product had an acid number of less than 5. Even lower acid numbers are obtained when the above times are increased.

EXAMPLE 13

296.2 parts of phthalic anhydride and 127.1 parts of dipentaerythritol were placed in a pressure vessel and heated at atmospheric pressure for 2 hours at a temperature within the range 110° C. to 140° C., while the mixture was continuously stirred. The acid which was formed had a determined acid value of 5.01 meq./gm. and a theoretical acid value of 4.72 meq./gm. 347.8 parts of propylene oxide were forced under pressure into the vessel containing the formed acid over a period of 7.5 hours while the temperature was maintained at 125-140° C. and the mixture was continuously stirred. Upon removal of the excess propylene oxide, it was determined that 225 parts of oxide had been reacted, corresponding to 7.64 moles of oxide per mole of acid product. The resulting product had a molecular weight of 1301, an OH number of 241, and an acid number of 0.09. The product had the following formula:

$$\begin{array}{cc} CH_2OX & CH_2OX \\ | & | \\ YOCH_2CCH_2OCH_2CCH_2OY \\ | & | \\ CH_2OX & CH_2OX \end{array}$$

where
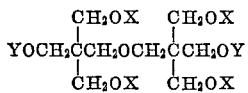

and
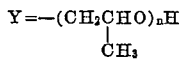

EXAMPLE 14

An acid product was prepared as in Example 13, using 296.2 parts of phthalic anhydride and 124.1 parts of tripentaerythritol. The acid product had a theoretical acid value of 4.76 meq./gm. and a determined acid value of 4.91 meq./gm. 343 parts of propylene oxide were continuously fed into the reaction vessel over a period of 6½ hours while the reactants were continuously stirred and maintained at a temperature of 125–150° C. The reaction product, after removal of excess propylene oxide, had a molecular weight of 1809, an OH number of 228 and an acid number of 0.30. From the excess oxide removed from the pressure vessel, it was determined that 179 parts of oxide had entered the reaction, corresponding to 8.87 moles of oxide per mole of acid product. The resulting reaction product had the formula:

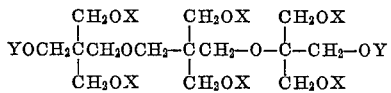

where X and Y are defined as in Example 13.

EXAMPLE 15

200.1 parts of succinic anhydride and 136.2 parts of pentaerythritol were heated in a pressure apparatus at a temperature of from 130–150° C., under pressure, over minutes at atmospheric pressure, with continuous stirring, until a theoretical acid value of 5.95 meq./gm. was reached for the formed reaction product. The determined acid value was 6.06 meq./gm.

347 parts of propylene oxide were continuously fed into the apparatus and reacted with the product at a temperature of from 130–150° C., under pressure, over a period of 6⅓ hours. It was determined that 226 parts of oxide reacted with the acid, corresponding to 3.90 moles of oxide per mole of acid product. The final reaction product had a molecular weight of 563, an OH number of 361, and an acid number of 5.28. The product had the formula:

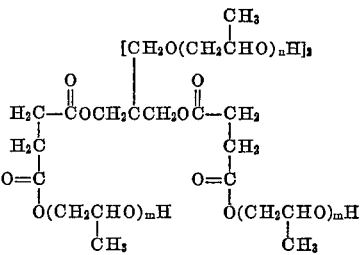

When the reaction time was increased to 9 hours, the acid number of the reaction product was less than 3 and even lower values are obtained when the reaction time is further increased.

EXAMPLE 16

392.2 parts of maleic anhydride and 272.3 parts of pentaerythritol were placed in a resin flask and heated at a temperature of 75–90° C. for 5⅙ hours, during which the determined acid value reached 5.83 meq./gm. The theoretical acid value was 6.03 meq./gm.

535 parts of this acid were placed in a Parr pressure apparatus and propylene oxide was continuously fed in under pressure for 10 hours, while maintaining the reaction temperature at 138–146 C. 343 parts of propylene oxide actually reacted, corresponding to 3.66 moles of oxide per mole of acid product. The product had a molecular weight of 544, an OH number of 362, and an acid number of 0.15. The product had the formula:

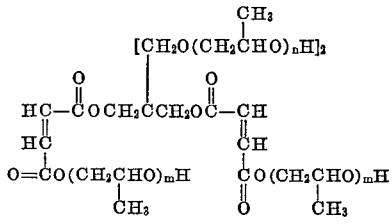

EXAMPLE 17

296.2 parts of phthalic anhydride and 136.2 parts of pentaerythritol were placed in a pressure apparatus and heated, at atmospheric pressure, at a temperature of 110° C.–124° C. for 3½ hours while being continuously stirred. The formed acid had a theoretical acid value of 4.63 meq./gm. and a determined acid value of 4.64 meg./gm. 555 parts of epichlorohydrin were continuously fed in over a period of 7 hours while the temperature of the reaction was kept at 126° C.–148° C. During this time 344 parts of epichlorohydrin had actually reacted. This corresponds to 3.72 moles of oxide per mole of acid product. The reaction product had a molecular weight of 776, an OH number of 273 and an acid number of 0.23. Chlorine analysis showed 17% calculated and 17.9% determined. The product had the formula:

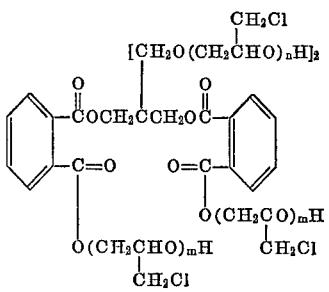

The products from the above examples ranged from clear white to brown and were of varying viscosities, depending upon the polyhydroxy compound used, the anhydride used, and the number of anhydride units added to the polyhydroxy material.

The novel compounds, as is apparent from the formulas in the above examples, all have active hydrogens and are useful in preparing polyurethane resins and foams by reacting them with polyisocyanates, either alone or in combination with other polyols and diluents, using conventional processes known in the polyurethane art.

EXAMPLE 18

240 parts of the reaction product of Example 7, 4 parts of a silicone-type surfactant, 4 parts tetramethylbutanediamine, 77 parts of propoxylated dibutyl pyrophosphoric acid and 95 parts of trichloromonofluoromethane were blended together, with stirring, at room temperature. 250 parts by weight of polymethylene polyphenyl isocyanate were added to the blended mixture, while the mixture was continuously stirred. The mix was stirred for an additional 13 seconds and poured into a pan were it proceeded to foam. In about 80 seconds, the foam was tack-free and it was then cured at room temperature for 24 hours.

The foam thus produced had a density of 2.11 lbs./cu. ft. and had a fine, uniform cell structure. After exposure to a temperature of 150° F. and 95–100% relative humidity for 28 days, the volume increased 28%. This compares to an increase in volume of 9% in another sample of this same foam when exposed to a forced draft of 120° C. in an oven for 24 hours. Pursuant to ASTM 169–59T, the foam was designated as non-burning.

As described in the above examples, the process of the invention may be practiced by reacting the anhydride, polyol and alkylene oxide in a single step while the components are under pressure, or by first forming the acid reaction product of the anhydride and the polyol and then adding all of the alkylene oxide thereto and reacting the oxide with the acid product. Alternatively, the alkylene oxide may be continuously fed over a period of time into a pressure apparatus containing the formed acid product. In still another embodiment, the anhydride, polyol and a portion of the alkylene oxide are placed in a Parr pressure apparatus and while the reaction is proceeding, the remaining alkylene oxide is continuously fed therein under pressure.

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all of the features of patentable novelty which reside in the present invention including all features which would be treated as equivalents thereof by those skilled in the art to which the invention pertains.

What is claimed is:

1. A polyester polyol of the formula:

$$[H(OCHCH_2)_m O\underset{R'}{\overset{O}{\overset{\|}{C}}}-A-\overset{O}{\overset{\|}{C}}O]_y-R-[O(CH_2CHO)_n H]_x$$

wherein:
A is the nucleus of a dicarboxylic acid anhydride,
R is the nucleus of a polyhydroxy compound having from 2–8 hydroxyl groups,
R' is a member selected from the group consisting of H, lower alkyl and halogen-substituted lower alkyl,
$x$ is a number from 0–7,
$y$ is a number from 1–8, and when $x$ is 0 then $y$ is at least 4,
$m$ has a value of from 1.0–1.5, and
$n$ has a value of from 0.5–1.5.

2. The polyester polyol as defined in claim 1 wherein A is the nucleus of an aromatic dicarboxylic acid anhydride selected from the group consisting of phthalic, halogen-substituted phthalic, nitro-substituted phthalic, alkyl-substituted phthalic, homophthalic, and naphthalic anhydrides.

3. The polyester polyol as defined in claim 1 wherein A is the nucleus of an aliphatic dicarboxylic acid anhydride selected from the group consisting of
   (1) adipic, azelaic, glutaric, suberic, itaconic, pimelic, succinic, and maleic anhydride,
   (2) halogen-substituted, nitro-substituted, and alkyl-substituted members of the aforesaid group (1),
   (3) chlorendic, hydrophthalic, endomethylene phthalic, camphoric and acetonedicarboxylic anhydrides.

4. The polyester polyol as defined in claim 1 wherein R is the nucleus of a polyhydroxy compound having from 2–8 hydroxyl groups selected from the group consisting of glycols, polyalkoxylated glycols, glycerol, polyalkylolalkanes, pentaerythritol, dipentaerythritol, tripentaerythritol, methylglucoside, sorbitol, mannitol, sucrose, dextrose, fructose, maltose, and polyalkoxylated sucrose.

5. A polyester polyol as defined in claim 1 wherein A is the nucleus of phthalic acid anhydride,
R is the nucleus of pentaerythritol, and
R' is methyl.

6. A polyester polyol as defined in claim 1 wherein A is the nucleus of phthalic acid anhydride,
R is the nucleus of trimethylolpropane, and
R' is methyl.

7. A polyester polyol as defined in claim 1 wherein:
A is the nucleus of phthalic acid anhydride,
R is the nucleus of methyl glucoside, and
R' is methyl.

8. A polyester polyol as defined in claim 1 wherein:
A is the nucleus of phthalic acid anhydride,
R is the nucleus of sucrose, and
R' is methyl.

9. A polyester polyol as defined in claim 1 wherein:
A is the nucleus of phthalic acid anhydride,
R is the nucleus of propoxylated sucrose, and
R' is methyl.

10. A polyester polyol as defined in claim 1 wherein:
A is the nucleus of phthalic acid anhydride,
R is the nucleus of d-sorbitol, and
R' is methyl.

11. A polyester polyol as defined in claim 1 wherein:
A is the nucleus of phthalic acid anhydride,
R is the nucleus of dipentaerythritol, and
R' is methyl.

12. A polyester polyol as defined in claim 1 wherein:
A is the nucleus of phthalic acid anhydride,
R is the nucleus of tripentaerythritol, and
R' is methyl.

13. A polyester polyol of the formula:

$$[H(OCHCH_2)_m O\underset{R'}{\overset{O}{\overset{\|}{C}}}-A-\overset{O}{\overset{\|}{C}}O]_y-R-[O(CH_2CHO)_n H]_x$$

wherein A is the nucleus of a dicarboxylic acid anhydride selected from the group consisting of:
   (a) aromatic anhydrides selected from the group consisting of phthalic, halogen-substituted phthalic, nitro-substituted phthalic, alkyl-substituted phthalic, and naphthalic anhydrides,
   (b) aliphatic anhydrides selected from the group consisting of:
      (1) adipic, azelaic, glutaric, suberic, itaconic, pimelic, succinic, and maleic anhydride,
      (2) halogen-substituted, nitro-substituted, and alkyl-substituted members of the aforesaid group (1),
      (3) chlorendic and acetonedicarboxylic anhydrides, hydrophthalic, endomethylene phthalic, and camphoric anhydrides,
R is the nucleus of a polyhydroxy compound having from 2–8 hydroxyl groups and is selected from the group consisting of glycols, polyalkoxylated glycols, glycerol, polyalkylolalkanes, pentaerythritol, dipentaerythritol, tripentaerythritol, methylglucoside, sorbitol, mannitol, sucrose, dextrose, fructose, maltose, and polyalkoxylated sucrose, R' is a member selected from the group consisting of H, lower alkyl and halogen-substituted lower alkyl, $x$ is a number from 0–7, $y$ is a number from 1–8, and when $x$ is 0 then $y$ is at least 4, $m$ has a value of from 1.0–1.5, and $n$ has a value of from 0.5–1.5.

14. The compound of the formula

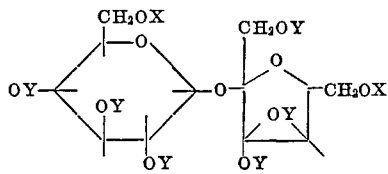

where X is

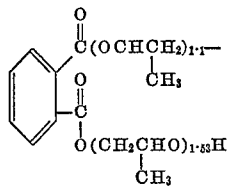

and Y is

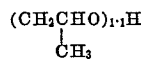

15. The compound of the formula

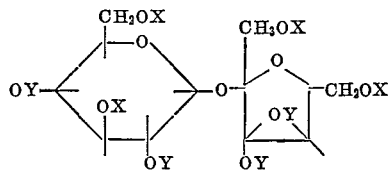

where X is

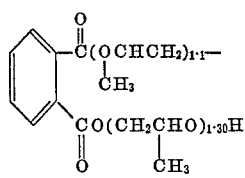

and Y is

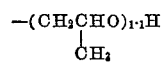

16. The compound of the formula

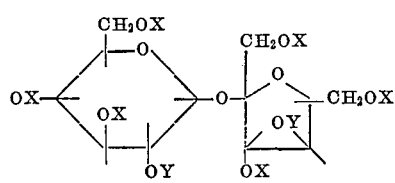

where X is

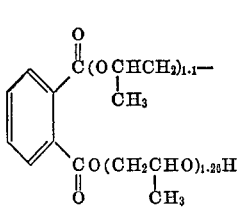

and Y is

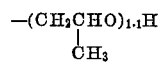

17. The compound of the formula

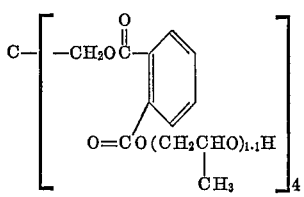

18. The process of forming a monomeric polyester polyol having a low acid number comprising reacting, at a temperature sufficient to permit the reaction to proceed, a dicarboxylic acid anhydride, a polyol having from 2 to 8 OH groups, and an alkylene oxide, the number of OH groups on said polyol being at least sufficient to react with all of said anhydride, said alkylene oxide being present in an amount in excess of that required to react with the functional OH groups of the reaction product of said polyol and said anhydride, and removing the excess oxide from the formed monomeric polyester polyol.

19. The process of forming a monomeric polyester as defined in claim 18 wherein said dicarboxylic acid anhydride is a member selected from the group consisting of
(a) aromatic anhydrides selected from the group consisting of phthalic, halogen-substituted phthalic, nitro-substituted phthalic, alkyl-substituted phthalic, homophthalic and naphthalic anhydrides,
(b) aliphatic anhydrides selected from the group consisting of
(1) adipic, azelaic, glutaric, suberic, itaconic, pimelic, succinic, and maleic anhydride,
(2) halogen-substituted, nitro-substituted, and alkyl-substituted members of the aforesaid group (1),
(3) chlorendic, hydrophthalic, endomethylene phthalic, camphoric, and acetonedicarboxylic anhydrides, and said polyol is a member selected from the group consisting of glycols, polyalkoxylated glycols, glycerol, polyalkylolalkanes, pentaerythritol, dipentaerythritol, tripentaerythritol, methylglucoside, sorbitol, mannitol, sucrose, dextrose, fructose, maltose, and polyalkoxylated sucrose.

20. The process as defined in claim 19 wherein said anhydride is phthalic acid anhydride, said polyol is pentaerythritol, and said alkylene oxide is propylene oxide.

21. The process as defined in claim 19 wherein the temperature at which the anhydride and the polyol react is below 160° C.

22. The process as defined in claim 19 wherein the time during which the components react is from about 2 to about 20 hours.

23. The process as defined in claim 19 wherein the components react for a period of time sufficient to permit the acid number of the monomeric polyester polyol to be less than 3.

24. A process of forming a monomeric polyester polyol having a low acid number comprising the steps of reacting, at a temperature sufficient to permit the reaction to proceed, a mixture of a dicarboxylic acid anhydride and a polyol having from 2 to 8 hydroxyl groups to form an acid reaction product, the number of hydroxyl groups on said polyol being at least sufficient to react all of said anhydride with said polyol, continuously adding to said acid product and reacting therewith an alkylene oxide while maintaining said acid product under pressure, said oxide being added in an amount in excess of that necessary to react with the functional groups on said acid reaction product, and removing said excess alkylene oxide from the monomeric polyester polyol which is formed.

References Cited
UNITED STATES PATENTS

| | | | |
|---|---|---|---|
| 3,089,863 | 5/1963 | Hicks | 260—873 |
| 2,962,524 | 11/1960 | Hostettler et al. | 260—234 |
| 3,010,906 | 11/1961 | Signouret et al. | |
| 3,022,335 | 2/1962 | Lundsted. | |
| 3,024,229 | 3/1962 | Hagge et al. | 260—234 |
| 3,045,042 | 7/1962 | Starker et al. | |
| 3,053,830 | 9/1962 | Gaertner | 260—234 |
| 3,098,065 | 7/1963 | Crecelius et al. | 260—234 |
| 3,102,114 | 8/1963 | Komori et al. | 260—234 |
| 3,162,616 | 12/1964 | Dombrow et al. | |
| 3,219,657 | 11/1965 | Gaertner | 260—234 |

FOREIGN PATENTS

| | | |
|---|---|---|
| 642,350 | 8/1950 | Great Britain. |
| 766,771 | 1/1957 | Great Britain. |
| 817,372 | 7/1957 | Great Britain. |
| 915,891 | 1/1963 | Great Britain. |

OTHER REFERENCES

Miyake Jour. of Polymer Science, vol. 38, 1959, p. 492.

LEWIS GOTTS, Primary Examiner

J. R. BROWN, Assistant Examiner

U.S. Cl. X.R.

260—2, 209, 234, 468, 471, 475, 485

UNITED STATES PATENT OFFICE
CERTIFICATE OF CORRECTION

Patent No. 3,459,733          Dated August 5, 1969

Inventor(s) WENDELL M. BYRD, JR. and VASCO G. CAMACHO

It is certified that error appears in the above-identified patent and that said Letters Patent are hereby corrected as shown below:

In Column 2, last formula, lower right-hand member reading

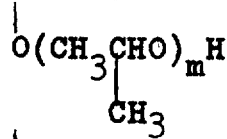

should read

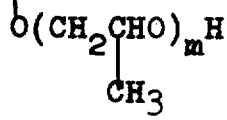

Column 3, line 9, "change" should read --chance--.
Column 7, line 16, "7146" should read --1746--. Column 8, first formula, lower right-hand member reading

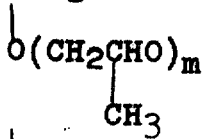

should read

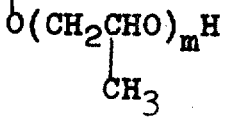

Column 9, line 69, "130-150°C., under pressure, over" should read --110°C to 130°C for about 70--. Column 10, line 33, "138-146 C" should read --138-146°C--. Column 10, line 53, "4.64 meg./gm" should read --4.64 meq./gm--. Column 10, last formula, lower right-hand member reading

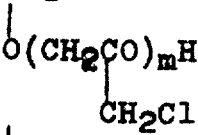

should read

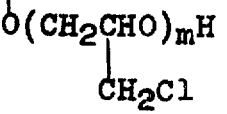

UNITED STATES PATENT OFFICE
CERTIFICATE OF CORRECTION

Patent No. 3,459,733          Dated August 5, 1969

Inventor(s) WENDELL M. BYRD, JR. and VASCO G. CAMACHO    PAGE-2

It is certified that error appears in the above-identified patent and that said Letters Patent are hereby corrected as shown below:

Column 11, line 33, "ASTM 169-59T" should read --ASTM 1692-59T--.

SIGNED AND SEALED
JUL 14 1970

(SEAL)
Attest:

Edward M. Fletcher, Jr.
Attesting Officer

WILLIAM E. SCHUYLER, JR.
Commissioner of Patents